United States Patent
Gao et al.

(10) Patent No.: US 8,213,434 B2
(45) Date of Patent: Jul. 3, 2012

(54) METHOD AND DEVICE FOR PROVIDING QOS CONTROL CAPABILITY FOR A PRESENCE SERVER AND SYSTEM THEREOF

(75) Inventors: Zhi Guo Gao, Beijing (CN); Zhe Xiang, Beijing (CN); Wei Xue, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/349,282

(22) Filed: Jan. 6, 2009

(65) Prior Publication Data

US 2009/0175279 A1 Jul. 9, 2009

(30) Foreign Application Priority Data

Jan. 9, 2008 (CN) .......................... 2008 1 0002823

(51) Int. Cl.
*H04L 12/28* (2006.01)

(52) U.S. Cl. .............. 370/395.21; 370/352; 370/465; 709/223; 709/227

(58) Field of Classification Search ............. 709/227, 709/205, 231, 228, 218, 235, 233, 226; 370/229, 370/340, 463, 260, 468, 329, 395.21, 401, 370/230
See application file for complete search history.

(56) References Cited

U.S. PATENT DOCUMENTS

| | | | |
|---|---|---|---|
| 7,035,923 B1 * | 4/2006 | Yoakum et al. | 709/224 |
| 7,257,218 B2 * | 8/2007 | Yoakum | 379/265.01 |
| 7,522,581 B2 * | 4/2009 | Acharya et al. | 370/352 |
| 7,869,364 B2 * | 1/2011 | Griffith et al. | 370/235 |
| 2004/0259532 A1 | 12/2004 | Isomaki et al. | |
| 2005/0021616 A1 * | 1/2005 | Rajahalme et al. | 709/204 |
| 2005/0058068 A1 | 3/2005 | Ben Ali et al. | |
| 2005/0105464 A1 | 5/2005 | Acharya et al. | |
| 2006/0165060 A1 * | 7/2006 | Dua | 370/352 |
| 2007/0206620 A1 * | 9/2007 | Cortes et al. | 370/412 |
| 2010/0067519 A1 * | 3/2010 | Mang et al. | 370/352 |
| 2010/0238839 A1 * | 9/2010 | Batteram et al. | 370/254 |

FOREIGN PATENT DOCUMENTS

WO WO 2006114135 A1 11/2006

OTHER PUBLICATIONS

WO_2005055549 Published Jun. 16, 2005 by Dekeyzer et al.*
Cho, et al., "SIP-based Qos support architecture and session management in a combined IntServ and DiffServ networks," Computer Communications, May 17, 2006, pp. 2-15.
"Configuring SIP Message, Timer, and Response Features," Cisco IOS SIP Configuration Guide, Cisco IOS Voice Configuration Library, Cisco IOS Release 12.4, Oct. 10, 2008,pp. 1-140.
Kim, "Inter-AS Session & Connection Management for QoS-guaranteed DiffServ Provisioning," 3rd ACIS Int'l Conference on Software Engineering Research, Aug. 11-13, 2005, pp. 325-330.

* cited by examiner

*Primary Examiner* — Michael J Moore, Jr.
(74) *Attorney, Agent, or Firm* — Gail H. Zarick; Otterstedt, Ellenbogen & Kammer, LLP

(57) ABSTRACT

A method and device for QoS control for presence servers and a presence system supporting QoS control. The method for providing QoS capability for a presence server includes the steps of: receiving SIP (Session Initiation Protocol) messages; classifying said SIP messages based on a QoS policy; and delivering the classified SIP messages after a predetermined time corresponding to the QoS policy.

9 Claims, 9 Drawing Sheets

METHOD AND DEVICE FOR PROVIDING QOS CONTROL CAPABILITY FOR A PRESENCE SERVER AND SYSTEM THEREOF

CROSS-REFERENCE TO RELATED APPLICATIONS

This application claims priority under 35 U.S.C. §119 to Chinese Patent Application No. 200810002823.2 filed Jan. 9, 2008, the entire contents of which are incorporated by reference herein.

BACKGROUND OF THE INVENTION

1. Field of the Invention

The present invention relates to presence technology for instant message service, and in particular, to a method and device for providing Quality of Service (QoS) control capability for a presence server and a presence system supporting QoS control.

2. Description of the Related Art

Presence technology is an important enabler for many kinds of applications. Presence technology is starting to appear in numerous applications other than instant messaging. For example, Microsoft Corporation is adding presence capabilities into applications such as Word, Excel, Outlook and others. IBM Corporation has added presence capabilities to Lotus Notes 7.0. It is likely that presence technology will be used more often in many different scenarios.

FIG. 1 shows a conventional Session Initiation Protocol (SIP)-based presence system. The presence system shown in FIG. 1 supports three primary operations: subscription, notification, and publication.

As shown in FIG. 1, the SIP-based presence system includes a presentity 103, a presence server 101 and a watcher (including a subscriber 105 and a fetcher 107). The presence server 101 is a core entity by which the presence technology can be implemented and it is is a functional entity which accepts, stores and distributes presence information, distributes watcher information, receives presence information from many presentities 103, and merges the presence information received from one or more presentities 103 into one single document according to the rules determined by an information model. In the case where the system can be managed and user privacy can be ensured, the fetcher 107 is allowed to inquire presence information actively or the subscriber 105 is allowed to subscribe presence information according to predetermined rules.

Subscribing to presence information service means to request the presence server 101 to automatically deliver some presence information concerned by users in some cases. Users can subscribe to each other. A user who delivers a subscription request is referred to as subscriber. A user who is subscribed to is called a subscribee.

FIG. 2 shows a present implementation structure of the presence server 101 based on the current J2EE architecture. Referring to FIG. 2, a SIP Servlet (Siplet) is shown. The Siplet is a set of APIs, which defines a set of high level extended APIs for a SIP server. The Siplet allows a SIP application to use a servlet model for deployment and management. It follows the JSR 116 specification. JSR is a standard organization of the Java community that incorporates manufacturers such as Sun, IBM, BEA and others and 116 is the serial number of the specification.

As shown in FIG. 2, the implementation structure of the presence server 100 is approximately divided into three layers from top to bottom.

The third layer is a SIP stack layer 250 which is responsible for the implementation of a SIP protocol, including network connection management, SIP message parsing and basic processing in a SIP transaction layer.

The second layer is a Siplet container layer 230 which is a module whose interfaces conform to industry standards and is used to provide the required support for running a Java Servlet, such as creating a servlet and maintaining its life cycle. Apache Tomcat and corresponding products of companies such as IBM, BEA, etc. are examples of a Java servlet container.

As shown in FIG. 2, the secondary layer includes the following units: a Siplet context management unit 226, a Siplet management unit 227, a message-Siplet relationship unit 228, a timer management unit 229 and a session/conversation management unit 231. They are the structural units included in the secondary layer of an existing typical J2EE architecture-based presence server.

Every unit shown in FIG. 2 is static in the case of non-runtime and there are no invocation relationships among them. Only after a user has defined the relationships among them as required, the invocations among these units will occur according to the definitions at runtime. Since the actual invocation relationships among these units have no particular impact on the implementation of the present invention, the description thereof is herein omitted.

The Siplet context management unit 226 can be implemented as a data structure which stores information on SIP messages and SIP transactions in a certain format.

The Siplet management unit 227 is a unit which performs runtime management on the Siplet such as creation, elimination and the like.

The message-Siplet relationship unit 228 is used for managing relationships between the included SIP messages and the Siplet. The message-Siplet relationship unit 228 associates the SIP messages with the Siplet supported by the first layer (i.e., the SIP application/presence application layer 210) based on the destination address included in the SIP messages.

The timer management unit 229 can be referred to as a clock service unit or as a timer management service unit. With interfaces provided by the unit, a timer event to be generated at a certain time or time interval is specified and an event monitor (an invoked method/function) can be registered for this event. When a Timer event occurs, this event monitor can receive notifications and corresponding methods/functions can be invoked.

Utilizing such a function provided by the Timer management unit 229, a developer can implement a periodically executed routine or a routine which is executed after a specific time period. Various versions for the implementation (for example, IBM, BEA, SUN, etc.) of J2SE (Java 2 Standard Edition) and J2EE (Java 2 Enterprise Edition) provide many kinds of clock service in different layers. For example, the basic standard library included in JDK has a clock service therein and the CommonJ criterion collaboratively provided by IBM and BEA also has a timer management service therein.

In a SIP protocol, session and conversation are two strictly defined concepts. Among other things, a conversation represents a peer-to-peer SIP relationship between communicating parties which lasts for a period of time. The life cycle of a typical conversation begins when the calling party dials and ends when either of the two parties hang up. The conversation is built by a SIP message such as a response to an INVITE request. The conversation is marked by an identifier, a local tag and a remote tag.

In the SIP protocol, a session refers, in particular, to a multimedia session. A multimedia session consists of a group of multimedia senders and receivers and data streams from senders to receivers. A multimedia conference is an example of a multimedia session. A session can include many conversations. While a conversation may relate only to two peer-to-peer parties, a session can relate to many parties.

From above definitions, a SIP application such as the presence server 101 can simultaneously maintain many sessions which correspond to sequences interacted with different users and correspond to many interactive sequences with the same user. The session/conversation management unit 231 is responsible for mapping incoming and outgoing SIP messages to sessions and conversations so that the messages can be processed by using the information of the sessions and conversations. For example, for an incoming SIP request message, in an attempt to match conversations, can be determined to see whether the message is a message initiating a session or a message in a session so that different processing routines can be used. For example, when the load is high, more resources will be used for completing an already started conversation rather than initiating a new conversation. As another example, for an outgoing message, a Siplet can simply ask to deliver a 200 OK response message even though the message is not complete. Through matching conversations, some routing information recorded in the conversation can be utilized to supplement message headers.

The first layer is a SIP application/presence application layer 210 which includes one or a group of SIP servlets that are responsible for implementing core functions of a presence server.

The interfaces among these three layers conform to industry standards. A Siplet interface is a primary interface between the first layer and the second layer. Each SIP message will be submitted to and processed by a certain Siplet. The Siplet implements the service logic of a presence server by processing SIP messages. The interface between the second and third layer is a JAIN interface. Both interfaces are API interfaces.

In an existing presence system, each incoming presence update (publication) will generate many notification messages to be sent to all watchers. Thus, for each presence update, outgoing network traffic and CPU utilization rate will be high. Currently, in a presence server having a typical structure shown in FIG. 2, (1) incoming messages are analyzed in the third layer, (2) the traverse passages provided in the second layer directly arrive at a SIP servlet in the first layer, and (3) outgoing messages directly arrive at the third layer through the passages provided in the second layer and are sent out by the third layer. In other words, this implementation structure does not consider the QoS requirement for various messages and the impact on CPU utilization rate. Further, an existing SIP-based presence server does not perform admittance control in order to prevent the CPU from overloading. Thus, the processing performance and QoS ensure capability of the presence server is very limited.

Sometimes, when the status of a presentity that has many watchers is changed, a lot of notification messages will need to be processed in a short time, resulting in peak CPU utilization. That will cause the CPU to overload and lose important messages in some situations. Different applications have different QoS requirements. For example, the response latency of an IP telephone can be several milliseconds, the response latency of instant messaging can be several seconds, and the response latency of presence-based collaborative applications can be several minutes.

In US patent application No. US2005/0105464A1 published on May 19, 2005 to Acharya, et. al., a method and system for differentiated processing of SIP messages to perform a VoIP call control is disclosed. In this patent application, SIP messages are assigned to different queues depending on the type of the SIP messages where each queue uses a different service rate. However, the patent application does not show implementation of the intermediate layer of the J2EE architecture-based presence server and the processing is only unidirectional.

In patent application No. WO06114135A1 published on Nov. 2, 2006 to Anders, et. al., a message processing method and apparatus used in an IP multimedia sub-system is disclosed. The patent application generally relates to a mechanism for interaction among many components in an IP Multimedia Subsystem (IMS) which allows a user to not be affected by a message with a low QoS requirement such as a presence message or an instant message at the time of performing an IMS application with a high QoS requirement, e.g. Voice over IP and Video over IP. The patent application proposes to record the start and end of SIP session with a high QoS requirement utilizing the network server (NS) so that an entity such as a presence server can utilize the information to delay the message delivery. Therefore, the patent application directed to ensuring the QoS of a high priority VoIP application and ensuring the performance of high priority VoIP application at the cost of a low priority application using the interaction among various units of IMS system. However, it does not ensure the QoS of presence server.

SUMMARY OF THE INVENTION

In one embodiment, the present invention provides a method and device for providing QoS control capability for an existing presence server and a presence system that supports QoS control.

In one aspect, the present invention provides a method for providing QoS control capability for a presence server. The method includes the steps of: receiving SIP messages; classifying the SIP messages based on a QoS policy; and delivering the classified SIP messages after a predetermined time period corresponding to the QoS policy.

Another embodiment of the present invention provides a device for providing QoS control capability for a presence server. The device includes a QoS policy enforcement unit configured for fetching and providing QoS policies related to the received SIP messages; a SIP message classifier configured for classifying the SIP messages according to the QoS policy provided by the QoS policy enforcement unit; and a message distributing unit configured for delivering the classified SIP messages after a predetermined time period corresponding to the QoS policy.

Another embodiment of the present invention provides a presence system supporting the QoS control. The system includes a SIP application/presence application entity for providing a service program to be used by users; a Siplet container entity for implementing the method for providing QoS control capability for a presence server in order to provide services for the SIP application/presence application entity; and a SIP stack entity configured for implementing SIP protocols in order to provide services for the Siplet container entity.

Thus, with the present invention, the processing performance and QoS ensuring capability of existing presence servers can be improved by considering QoS requirements and system workloads.

BRIEF DESCRIPTION OF THE DRAWINGS

The present invention will be more easily understood in the following detailed description with reference to the appended drawing, in which the same reference number indicates the same structural element and in which.

DETAILED DESCRIPTION OF PREFERRED EMBODIMENTS

Figure 1:
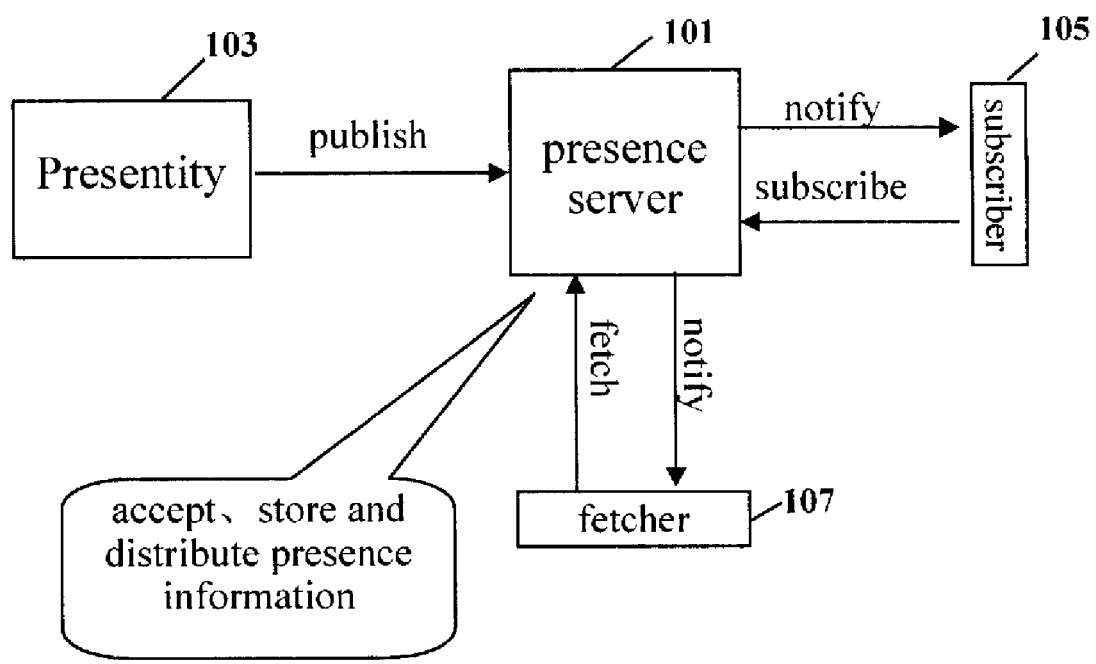
FIG. 1 is a diagram illustrating system structure of a conventional SIP-based presence system.
Figure 2:
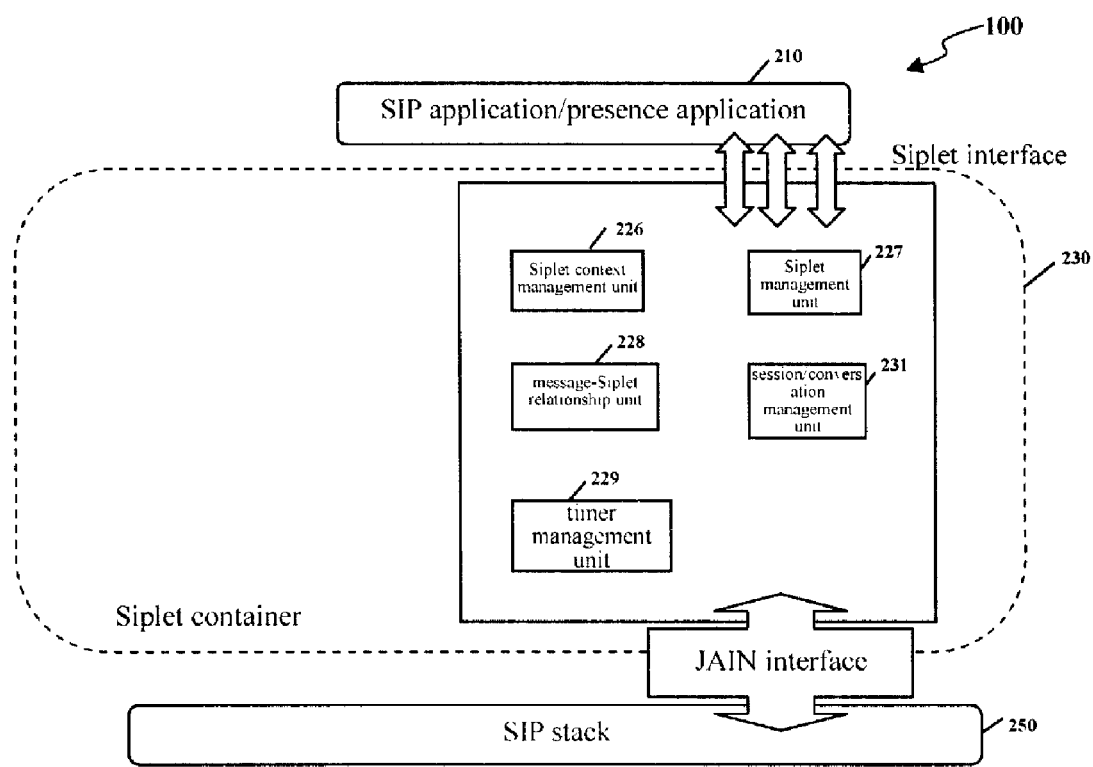
FIG. 2 is a block diagram illustrating implementation structure of a current J2EE architecture-based presence server.
Figure 3:
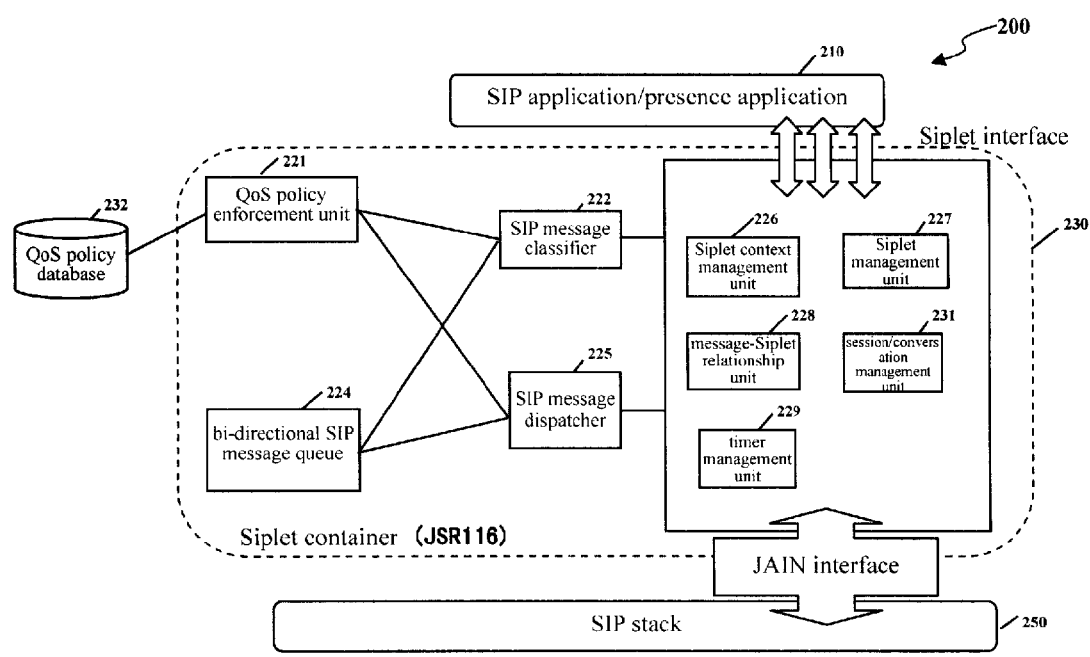
FIG. 3 is a block diagram illustrating implementation structure of a J2EE architecture-based presence server according to the first embodiment of the present invention.

Referring to FIG. 3, a presence server 200 according to one embodiment of the present invention is described. FIG. 3 includes all the units in FIG. 2 and the description of common units will be omitted for sake of brevity. The difference between FIG. 3 and FIG. 2 is that the second layer of the presence server 200 shown in FIG. 3 further includes a QoS policy enforcement unit 221, a SIP message classifier 222, a bidirectional SIP message queue 224, a SIP message dispatcher 225, and a QoS policy database 232 which can be inside or outside of the second layer but included in the presence server 200. The above mentioned units in the second layer together with units in the second layer shown in FIG. 2 constitute a Siplet container capable of implementing a QoS control. When the QoS policy database 232 is outside of the second layer, it is not a component of the Siplet container.

For FIG. 3, only the different structures between the presence server according to the first embodiment of the present invention which supports the QoS control and that of the prior art will be discussed in detail.

As shown in FIG. 3, the bidirectional message queue 224 is a unit which stores delayed SIP messages. The SIP messages can come from the upper layer, i.e. the SIP application/presence application layer 210, and also come from the lower layer, i.e. the SIP stack layer 250.

The QoS policy enforcement unit 221 can obtain and execute QoS policies stored in the QoS policy database 232.

The QoS policy is a kind of managing policy which is generally defined and configured by operators of the presence server 200.

The flexibility of a QoS policy is high. It can be a simple grade or it can also be a set of complex rules. Quantitative metrics defined by it can include response time, throughput, the number of concurrent users, occupancy rate of resources, etc. The number and classification of queues in the bidirectional SIP message queue 224 depends on the modeling of QoS policies to be supported. That is, the queue is a tool required for implementing QoS policies.

Hereinafter, we list examples of QoS policies and describe the processing performed by each unit in the second layer of the presence server 200 according to the present invention on the basis of the examples.

The first example is a simple grade. Subscribing users in a presence system are classified as gold users, silver users and brass users. Gold users have priority over silver and brass users in terms of service and silver users have priority over brass users in terms of service. Such a QoS policy can be described as follows:

{
  Policy 1: If a SIP message comes from a gold user, then the message is set as a gold message and the gold message will have priority over a silver message and a brass message in terms of processing;
  Policy 2: If the SIP messages comes from a silver user, then the message is set as a silver message and the silver message will have priority over a brass message in terms of processing;
  Policy 3: If the SIP message comes from a brass user, then the message is set as a brass message;
}

Apparently, this is a coarse-grained QoS policy. For instance, a user is determined as a gold user, a silver user or a brass user when he registers for a subscription and the user ID and/or address of the user is associated with his identity in the presence server. Thus, whenever a SIP message from a subscribed user is received, the identity of the user can be directly determined depending on the user ID and/or address.

A second example will define in more detail, a QoS policy using a quantitative metric of response time. The service content of a presence server is inquiring the position information of a entity, then SIP messages are classified into one of three categories according to the requirement for precision: a SIP message requiring a highly precise position (such as a precision of <1 meter), a SIP message requiring a moderately precise position (such as a precision of <5 meter), and SIP message requiring low precise position (such as a precision of <10 meter). Such a policy can be described as follows:

{
  Policy 1: If a SIP message is a message which requires a highly precise position, then the maximum waiting time of the message is set as 100 milliseconds;
  Policy 2: If a SIP message is a message which requires a moderately precise position, then the maximum waiting time of the message is set as 500 milliseconds;
  Policy 3: If a SIP message is a message which requires a low precise position, then the maximum waiting time of the message is set as 2 seconds;
}

In this example, the QoS policy is determined depending on the contents of the SIP message and is not a simple grade. The presence services ensure that services requested by users can satisfy quantitative metrics given in the QoS policy by classification, dispatching and other operations for the SIP messages, instead of simply, unconditionally and/or preferentially serving higher level users. For example, a SIP message requiring a highly precise position will be processed within a maximum of 100 milliseconds; a SIP message requiring a moderately precise position will be processed within a maximum of 500 milliseconds; a SIP message requiring a low precise position will be processed within a maximum of 2 seconds.

The above examples of QoS policies are only illustrative. They are not intended to limit the scope of the present invention to these particular examples. Rather, a user can define QoS policies with different complexities according to various requirements and create corresponding queues based on the QoS policies.

The SIP message classifier 222 can analyze SIP messages traversing the Siplet container, classify these SIP messages according to policies provided by the QoS policy enforcement unit 221, and deliver them to the bidirectional SIP message queue 224 for delay operation.

The SIP message dispatcher 225 fetches delayed SIP messages from the bidirectional SIP message queue 224 according to the policies provided by the QoS policy enforcement unit 221, invokes the related units included in an existing Siplet container as shown in FIG. 2 to perform processing, and sends the processed SIP messages out of the Siplet container. The SIP messages are sent to the upper SIP application/ presence application layer 210 or the lower SIP stack layer 250.

For the first abovementioned example, the SIP message classifier 222 classifies all incoming SIP messages into one of three kinds. Three queues which contain gold messages, silver messages and brass messages respectively can be provided in a bi-directional SIP message queue with respect to the QoS policies. Of course, as known by those skilled in the art, instead of providing more queues, tags corresponding to gold messages, silver messages and brass messages can be added to the header of a SIP message. Each time the SIP message dispatcher 225 needs to take out a SIP message to perform dispatch processing, the three queues can be sequentially checked. If the gold queue is not empty, then a gold SIP message will be taken out; if the silver queue is not empty, then a silver SIP message will be taken out; otherwise, if the brass queue is not empty, then a brass SIP message will be taken out. Using such a dispatching method, the operations for SIP messages in the silver and brass queues are delayed.

For the second abovementioned example, the SIP message classifier 222 classifies all incoming SIP messages into one of three kinds by reading the content of the SIP messages. Three queues which respectively contain messages whose maximum waiting time are respectively 100 milliseconds, 500 milliseconds and 2 seconds can be provided in a bi-directional SIP message queue with respect to the QoS policies. Of course, as known by those skilled in the art, instead of providing more queues, time stamps can be added to the header of the SIP messages to indicate whether or not the corresponding time is expired. Each time the SIP message dispatcher 225 needs to fetch a SIP message to perform dispatch processing, the three queues are simultaneously checked, the waiting messages are checked, and the messages having the earliest expiration are found and processed. Other messages continuously reside in queues and will continue to wait depending on the preset deadline.

The SIP message dispatcher 225 can merge related messages in queues into one message according to the SIP message type, target URL, QoS policy, etc., so that the number of transactions and the work load of the server will be reduced. Those skilled of the art can design a standard and method for message merging depending on existing knowledge.

An example of merging messages is as follows. Through reviewing the header information of a SIP message in a waiting queue (such as source address and destination address), the SIP information dispatching unit can find two position inquiry messages from watcher A to entity B in the same or different queue (source address indicates that these two inquiry messages are from watcher A, destination address indicates that the observation is to entity B). The two inquiries are merged into one inquiry and processed at the same time. In this example, merging can be performed in following way: first, merging the message body of the two SIP messages; then, using the merged message body as the message body of the message having the earliest expiration according to the QoS policies in the two inquiry messages; and finally deleting another message from the waiting queue.

Figure 4:
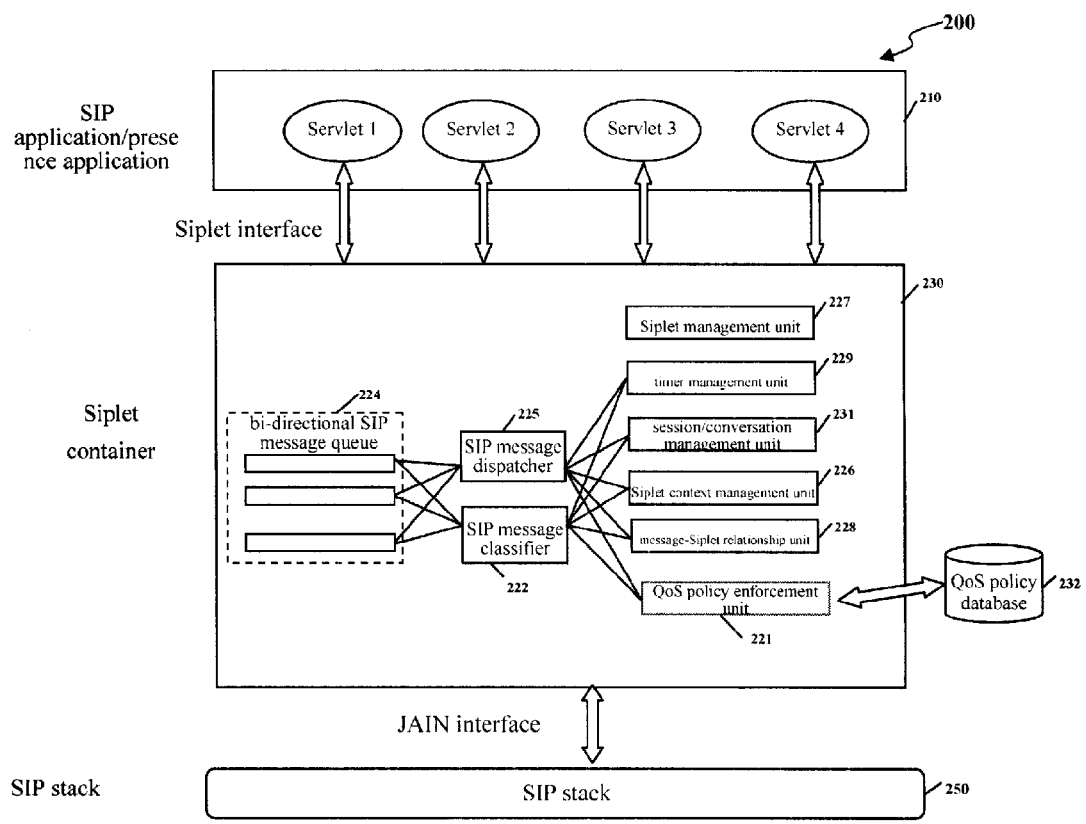
FIG. 4 is a block diagram illustrating operation principle of a J2EE architecture-based presence server according to the first embodiment of the present invention.

FIG. 4 is a block diagram illustrating the operation principle of a Siplet container for implementing the QoS control in a presence server 200 according to one embodiment of the present invention. FIG. 4 shows further details of FIG. 3 and only illustrates the operation principle capable of implementing the present invention. As shown in FIG. 4, a QoS policy enforcement unit 221, the SIP message classifier 222, bidirectional SIP message queue 224 and SIP message dispatcher 225 are new units introduced by the present invention. The invocation relationship between the SIP message classifier 222 and the SIP message dispatcher 225, the existing units, units provided by the present invention, the data fetching relationship between the QoS policy enforcement unit 221 and the QoS policy database 232 are also introduced.

Further descriptions of the invocation relationships and the data fetching relationships introduced by the present invention are provided as follows:

Invocation Relationships:

Invocation Relationship Between the SIP Message Classifier 222 and the SIP Message Dispatcher 225 and the Timer Management Unit 229:

The SIP message classifier 222 and the SIP message dispatcher 225 can schedule some timers with the timer management unit 229 and specify the overtime of these timers and action to be performed during overtime. For example, some messages are either sent to the upper layer or the lower layer or they are abandoned. However, the timer management unit 229 is not necessary for the SIP message dispatcher 225.

As understood by those skilled in the art, in the first abovementioned example, the SIP message dispatcher 225 need not consider whether a message has expired or not. As long as the SIP messages exist in a queue, the message will be fetched and sent out after processed. However, the SIP message dispatcher 225 can dispatch the delayed SIP messages in the bidirectional SIP message queue 224 according to the time service provided by the timer management unit 229. In the second abovementioned example, when a SIP message enters a queue, the SIP message dispatcher 225 can dispatch timers for it according to the maximum waiting time defined by the QoS policy thereof. When these timers are in overtime, if the message has yet not been processed, then the message will be deleted from the queue directly.

Invocation Relationship Between the SIP Message Classifier 222 and SIP Message Dispatcher 225 and the Session/ Conversation Management Unit 231:

The session/conversation management unit 231 records and manages information about a SIP session/conversation. The SIP message classifier 222 and SIP message dispatcher 225 can associate a particular SIP message with sessions/ conversations for the same Siplet by invoking the session/ conversation management unit 231 at the time of classifying and distributing messages so that the SIP messages can be processed on the basis of finer granularity and the classification operation can be completed by utilizing the session/ conversation information.

Invocation Relationship Between the SIP Message Classifier 222 or SIP Message Dispatcher 225 and the Siplet Context Management Unit 226:

Since the messages received from the upper layer or lower layer will first be stored in the Siplet context management unit 226 before entering the second layer, the SIP message classifier 222 will obtain the received messages by interacting with the Siplet context management unit 226. These messages are then further processed by the SIP message classifier 222 or the SIP message dispatcher 225. Further, the SIP message classifier 222 can store information such as the time when the messages are received, the message size, and information of the like, in the Siplet context management unit 226 to be used by applications and implementations in the first layer and/or second layer.

Invocation Relationship Between the SIP Message Classifier 222 and SIP Message Dispatcher 225 and the Message-Siplet Relationship Unit 228:

When messages are classified and distributed, the mapping relationship generally appear as some rule (such as a specific URL corresponding to a specific Siplet) between the message and Siplet to be used. More specifically, for messages to be transmitted to the SIP application/presence application layer 210, the message-Siplet relationship unit 228 can associate the SIP messages with a Siplet in the SIP application/presence application layer 210 according to the destination address of the messages. The message Siplet relationship unit 228 need not be invoked when SIP messages are sent out from a Siplet in the SIP application/presence application layer 210 because the Siplet message classifier 222 and the SIP message dispatcher 225 received an identification of which particular Siplet has delivered the SIP message, i.e., which Siplet in the SIP application/presence application layer 210 is associated with the SIP message.

Invocation Relationship Between the SIP Message Classifier 222 and SIP Message Dispatcher 225 and the QoS Policy Enforcement Unit 221:

The QoS policy enforcement unit 221 is responsible for interpreting the QoS policies and obtaining the decision results. The SIP message classifier 222 obtains the QoS policies and decision results by invoking the QoS policy enforcement unit 221, determining the service level of the SIP messages, and completing the SIP message classification. The SIP message dispatcher 225 retrieves available QoS policies by invoking the QoS policy enforcement unit 221 and performing the dispatch according to the service level of corresponding SIP messages. In general, messages with higher service levels have priority over messages with lower service levels in terms of being taken out from the bi-directional SIP message queue 224 by the SIP message dispatcher 225.

Data Fetching Relationships:

Data Fetching Relationship Between the QoS Policy Enforcement Unit 221 and the QoS Policy Database 232:

The QoS policy enforcement unit 221 fetches suitable policies from the QoS policy database 232. The QoS policy database has a structure that is similar to a database. It can be a standard database or a file.

Hereinafter, some details of the operation principle block diagram shown in FIG. 4 will be further described.

FIG. 4 shows that the bi-directional SIP message queue 224 is a multi-message queue. Each message queue represents a different service level. Although the term "queue" is used, those skilled in the art should understand that the purpose of distinguishing between the messages can be achieved through attaching a tag to every message to represent different service levels or using any other means capable of distinguishing between service levels. Further, the "queue" can be implemented as a storage, a file, etc.

Compared to existing presence systems, the presence server 200 according to the first embodiment of the present invention can provide certain QoS control capability (distinguishing between different service priorities). Its processing capability can also be strengthened (through merging SIP messages).

Figure 5:
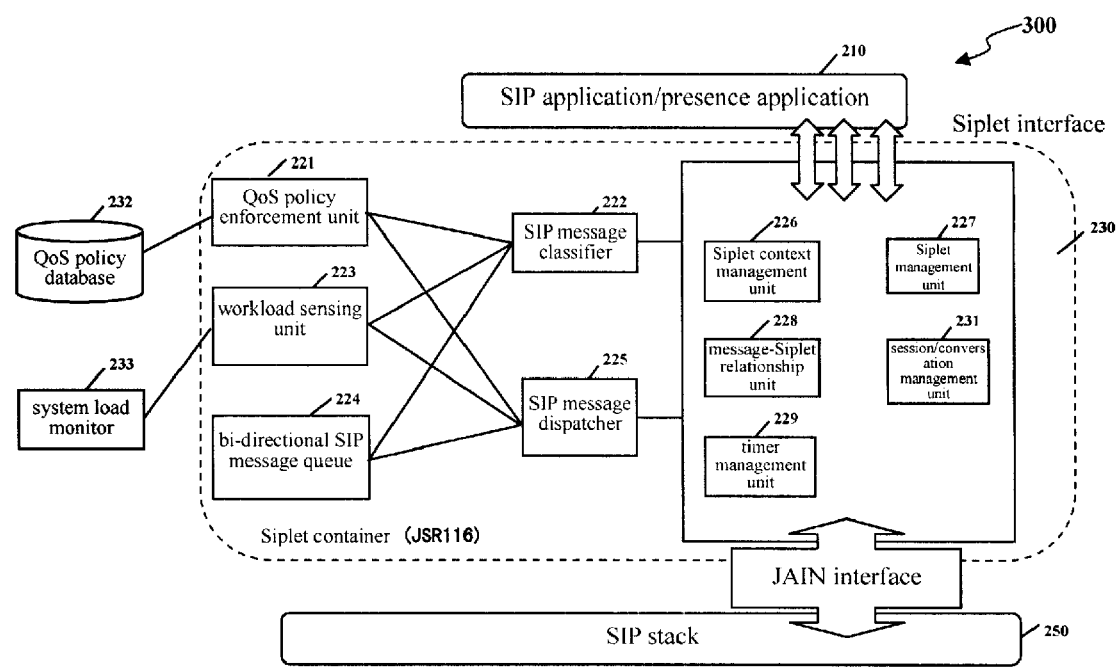
FIG. 5 is a block diagram illustrating implementation structure of a J2EE architecture-based presence server according to the second embodiment of the present invention.

Hereinafter, a presence server 300 according to the second embodiment of the present invention will be described with reference to FIG. 5. The presence server 300 provides further QoS control capabilities. FIG. 5 includes all the units in FIG. 3 and so the description of common units will be omitted for the sake of brevity. FIG. 5 and FIG. 3 differs in that the second layer of the presence server 300 shown in FIG. 5 further includes a workload sensing unit 223 and a system load monitor 233.

The workload sensing unit 223 is configured for obtaining the system workload. The workload sensing unit 223 together with various units in the Siplet container shown in FIG. 3 constitutes a Siplet container which is capable of implementing further QoS controls.

A system load monitor 233 which is configured for sensing the load of the current system such as the CPU utilization rate already exists in an existing presence system. However, in existing presence systems and presence systems according to the first embodiment of the present invention, the results produced by the system load monitor 233 that monitors current system loads is not associated with the operations of a presence server. The operation of a Siplet container can be associated with system loads by adding a workload sensing unit 223 to the Siplet container and obtaining the results produced by the system load monitor 233. More specifically, by sensing the system loads, the speed and capacity by which the system process SIP messages can be estimated and the kinds and number of admitted SIP messages can be regulated by using the estimation result so as to provide overload protection and to quantify QoS control capability with finer granularity.

The SIP message classifier 222 can fetch current system workload conditions by invoking the workload sensing unit 223. If the workload sensing unit 223 has sensed that the system workload is excessively high, then the SIP message classifier 222 can reduce the system loads by abandoning messages with low service levels in order to efficiently control the workload.

The SIP message dispatcher 225 can fetch current system workload conditions by invoking the workload sensing unit 223. If the workload sensing unit 223 has sensed that the system workload is excessively high, then the SIP message dispatcher 225 can reduce the system loads by abandoning messages with low service levels in order to leave processing capability for messages with high service levels.

For the first abovementioned example, in addition to performing classification according to QoS policies, the SIP message classifier 222 can fetch current system workload conditions by invoking the workload sensing unit 223. If the current system workload is not greater than 60% of the CPU utilization rate, then all messages will be accepted. If the current system workload is greater than 60% of the CPU utilization rate, then only gold and silver messages will be accepted. If the current system workload is greater than 80% of the CPU utilization rate, then only gold messages will be accepted. If the current system workload is greater than 95% of the CPU utilization rate, then any incoming messages will be denied.

Moreover, the SIP message dispatcher 225 can perform the dispatch according to the current system workload conditions. If the current system work load is not greater than 60% of the CPU utilization rate, then normal dispatching process will be performed. If the current system work load is greater than 60% of the CPU utilization rate, then only silver and brass messages will be checked; brass messages will not be processed. If the current system workload is greater than 85% of CPU utilization rate, then only gold messages will be checked; silver and brass messages will not be processed.

In the second example, in addition to performing classification according to QoS policies, the SIP message classifier 222 fetches the current system workload conditions by invoking the workload sensing unit 223. If the current system workload is not greater than 60% of the CPU utilization rate, then all messages will be accepted. If the current system workload is greater than 60% of the CPU utilization rate, then only messages that have highly precise positions and moderately precise positions will be accepted. If the current system workload is greater than 80% of CPU utilization rate, then only messages that have highly precise positions will be accepted. If the current system workload is greater than 95% of the CPU utilization rate, then any incoming message will be denied.

Further, the SIP message dispatcher also performs dispatch processing according to the current system workload determined by the workload sensing unit. For example, if the current system workload is less than 50% of the CPU utilization rate, then the invocation is performed consistent with abovementioned example; if the current system workload is greater than 50% of the CPU utilization rate, then a 2-second queue will be not checked. Instead, 100-millisecond and 500-millisecond queues will be dispatched using the methods in the abovementioned example.

Figure 6:
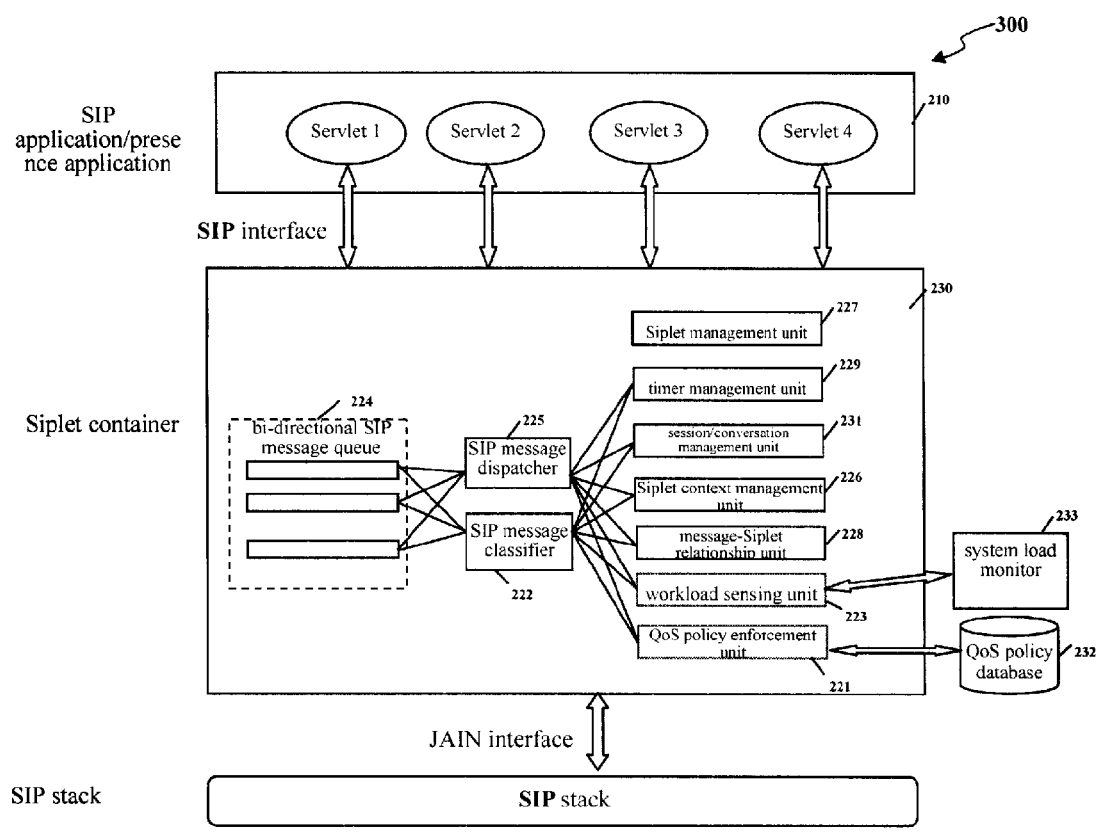
FIG. 6 is a block diagram illustrating operation principle of a J2EE architecture-based presence server according to the second embodiment of the present invention.

FIG. 6 is a block diagram illustrating the operation principles of a Siplet container for implementing further QoS capabilities in the presence server 300 according to the second embodiment of the present invention. FIG. 6 contains further details as compared to FIG. 5.

In addition to the invocation relationships and data fetching relationships shown in FIG. 4, the following invocation relationships and data fetching relationships also exist:

Invocation Relationship Between the SIP Message Classifier 222 and SIP Message Dispatcher 225 and Workload Sensing Unit 223:

When messages are classified and distributed, the current system load conditions such as the CPU utilization rate, the memory occupy rate, etc. can be fetched by the workload sensing unit 223 and suitable behaviors such as adding to a queue, distributing or abandoning, etc. are performed according to the load conditions.

Data Fetch Relationships Between the Workload Sensing Unit 223 and System Load Monitor 233:

The workload sensing unit needs to obtain information such as the CPU utilization rate from the system load monitor. Such information is not included in the conventional containers and generally need to be fetched from the operating system.

Through using the presence server according to the second embodiment of the present invention, some SIP messages can be captured and delayed for a certain amount of time according to the current system workload and the QoS policy. Then the messages are sent out from a Siplet container so that when the information processing capability of the hardware is not improved, the processing capability and the fine-grained QoS control capability of the presence server will be further improved.

Figure 7:
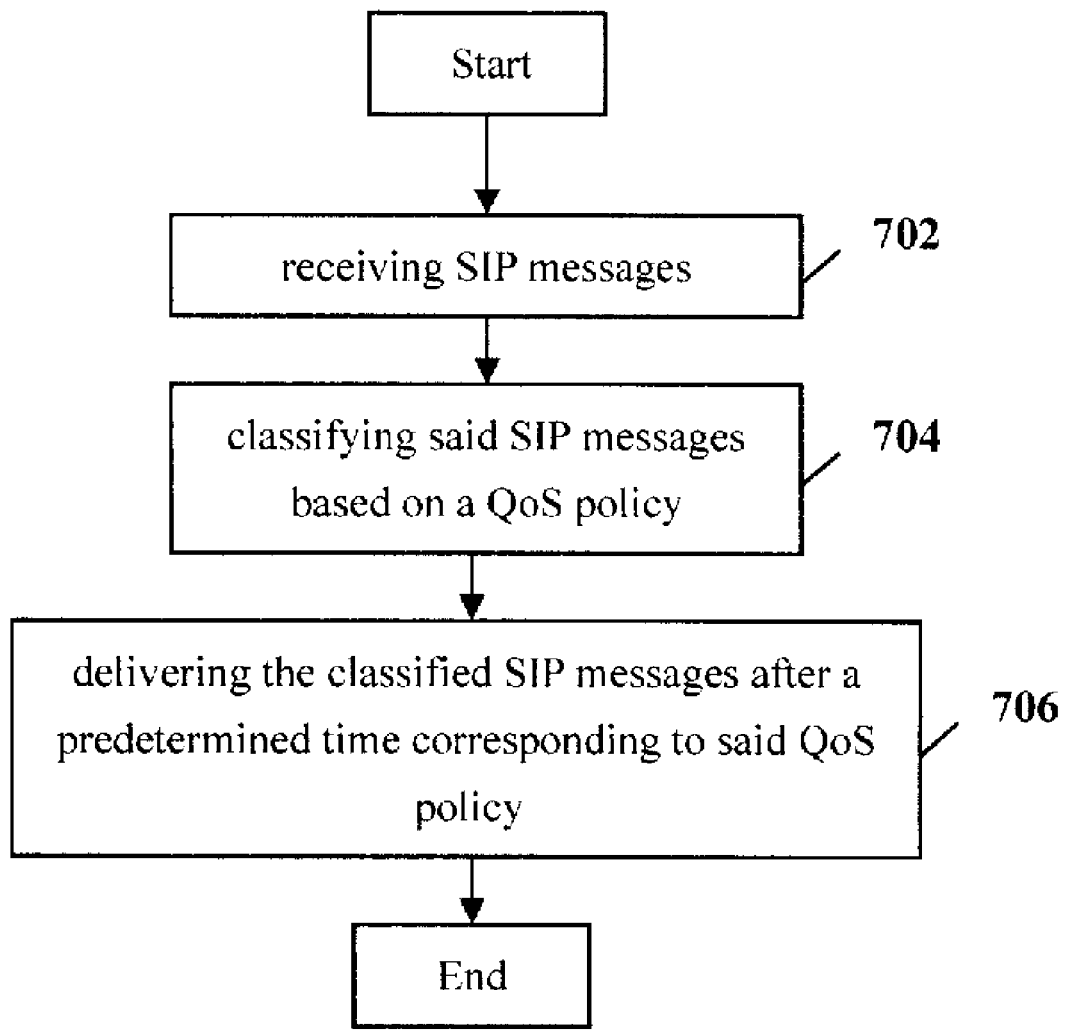
FIG. 7 is a flowchart illustrating a basic procedure for processing SIP messages in a Siplet container layer according to the present invention.

FIG. 7 is a flowchart illustrating a basic procedure for processing SIP messages in a Siplet container layer according to the present invention. In step 702, SIP messages are received. In step 704, the SIP messages are classified based on a QoS policy. In step 706, the classified SIP messages are delivered after a predetermined time related to the QoS policy.

Figure 8:
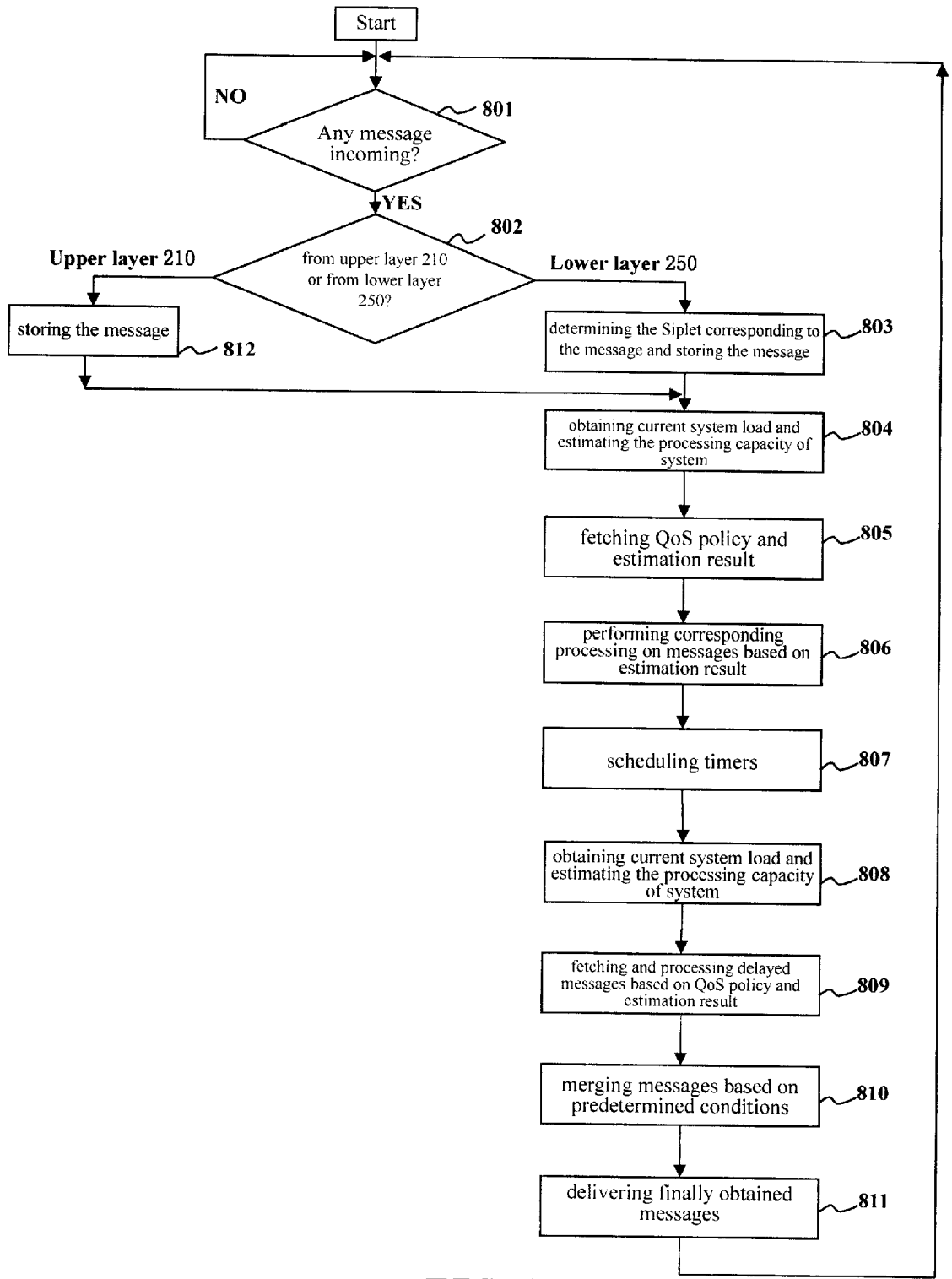
FIG. 8 is a flowchart illustrating details of a procedure for processing SIP messages in a Siplet container layer according to the present invention.

FIG. 8 is a flowchart illustrating the details of a procedure for processing SIP messages in a Siplet container layer according to the present invention. All the steps that are executed in the Siplet container layer 230 are described in FIG. 8 for the processings therein. Those skilled in the art can choose the steps and the orders according to various requirements.

In step 801, a determination is made as to whether any SIP message has entered the Siplet container. The enforcer of this step is the same as that of the prior art. If a SIP message has entered the Siplet container, then the process proceeds to step 802; if not, step 801 continues.

In step 802, a determination is made as to whether the message comes from the upper layer 210 (i.e. the SIP application/presence application 210) or the lower layer 250 (i.e. the SIP stack layer 250). The enforcer of this step is the same as that of the prior art. If the message comes from the lower layer 250, then the process proceeds to step 803; if the message comes from the upper layer 210, then the process proceeds to step 812.

In step 803, the message-Siplet relationship unit 228 determines a Siplet corresponding to the message. This message is then delivered to the Siplet context management unit 226 for storage. In step 802, the message is sent to the Siplet context management unit 226 for direct storage. After that, the process proceeds to step 804 upon the completion of these two steps.

In step 804, the workload sensing unit 223 obtains the current system load and estimates the processing capacity of the system.

In step 805, the QoS policy enforcement unit 221 obtains a QoS policy, estimates the QoS policy and obtains the estimation result. Optionally, when the estimation result is determined, the current system load and estimated system processing capacity can also be considered.

In step 806, the SIP message classifier 222 classifies the SIP message and adds it to the bi-directional SIP message queue 224 to delay and wait for further processing or it abandons the SIP message.

In step 807, the timer management unit 229 is configured for scheduling timers for corresponding queues to provide the timing for processing corresponding messages.

In step 808, the workload sensing unit 223 obtains the current system load and estimates the processing capacity of the system.

In step 809, the workload sensing unit 223 obtains the QoS policies and the estimation result. Optionally, when the estimation result is determined, the current system load and the estimated system processing capacity can also be considered. Depending on the estimation result, the SIP message dispatcher 225 fetches a corresponding delayed SIP message from the bi-directional SIP message queue 224 and further determines whether to process the SIP message or abandon the SIP message.

In step 810, the SIP message dispatcher 225 merges the messages based on predetermined conditions. For example, the messages are stored in a window area with a certain size in the bi-directional SIP message queue 224 and they go to the same destination or they have the same priority and go to the same destination.

In step 811, a finally obtained SIP message is sent out of the Siplet container layer 230. The executer of this step is the same as that of the prior art.

Accordingly, the present invention apparently has following technical advantages:

The SIP message flows of a presence server are controlled according to QoS policies. For certain SIP messages of the presence server, a certain delay period is accepted for predetermined application scenarios. The present invention can provide QoS safeguard functions such as fine-grained distinguished services, overload protection, etc. for the presence server, thus exhibiting better performance and stability for ends users.

The present invention need not modify the SIP stack and presence server application and thus remain unmodified. Various SIP stacks and presence servers can be used in the presence server system and so the present invention is compatible with the structure of existing presence servers.

Delayed SIP messages can be merged. Since some SIP messages are enforced to be delayed in a container, such as during instant messaging scenarios, many SIP notification messages (that are sent to the same receiver) can be merged together so the computing resources and network bandwidth resources in the system are saved.

Figure 9:
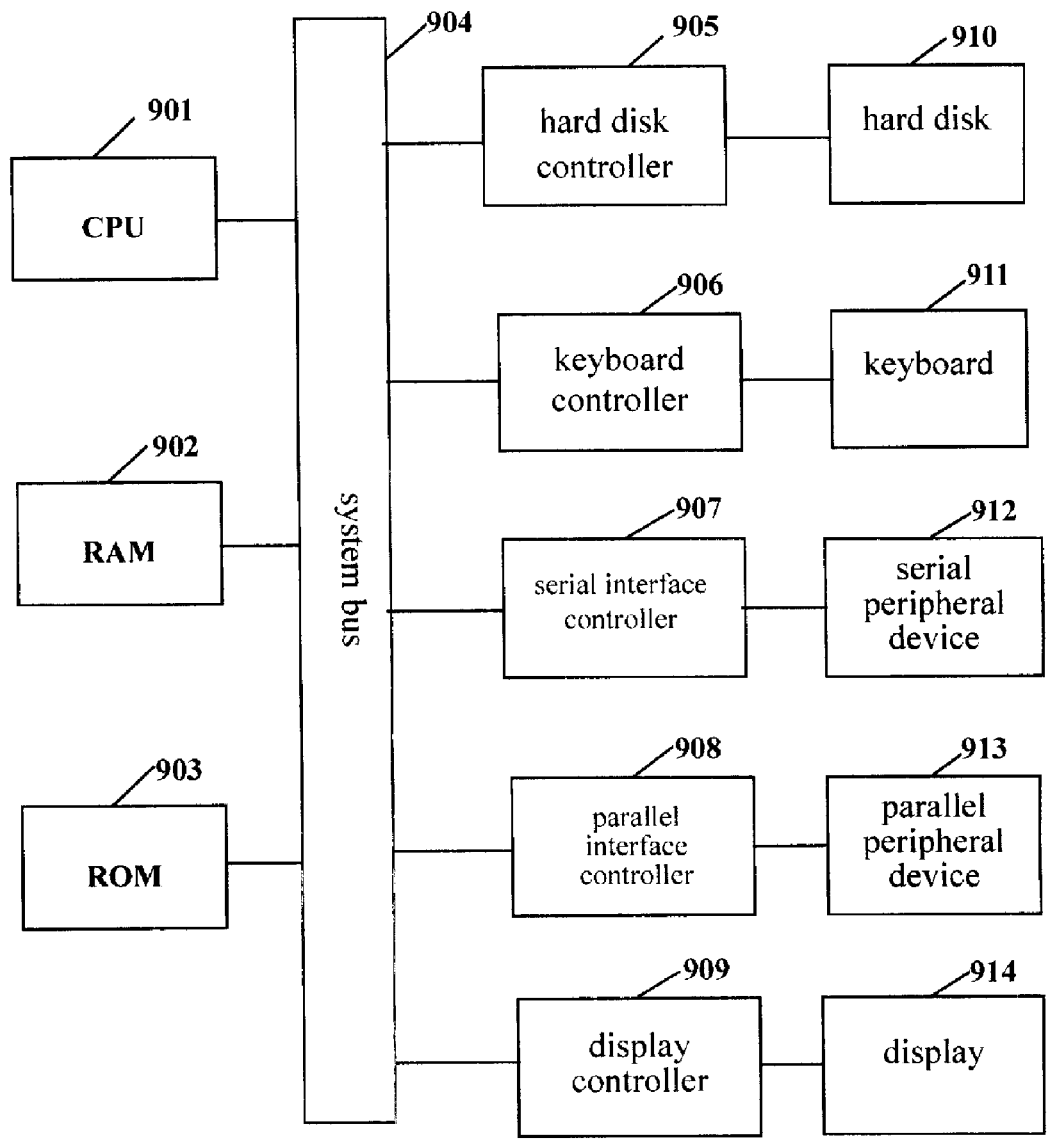
FIG. 9 is a block diagram schematically illustrating a computer system capable of implementing the present invention.

FIG. 9 schematically illustrates a computer system capable of implementing the present invention. The computer system shown in FIG. 9 includes a Central Processing Unit (CPU) 901, Random Access Memory (RAM) 902, Read-Only Memory (ROM) 903, system bus 904, Hard Drive (HD) controller 905, keyboard controller 906, serial interface controller 907, parallel interface controller 908, display controller 909, hard disk 910, keyboard 911, serial peripheral device 912, parallel peripheral device 913, and display 914.

In these components, the CPU 901, RAM 902, ROM 903, HD controller 905, keyboard controller 906, serial interface controller 907, parallel interface controller 908, display controller 909 are connected to the system bus 904. The hard disk 910 is connected to the HD controller 905. The keyboard 911 is connected to the keyboard controller 906. The serial peripheral device 912 is connected to the serial interface controller 907. The parallel peripheral device 913 is connected to the parallel interface controller 908. The display 914 is connected to the display controller 909.

In different applications, some of the components shown in FIG. 9 can be omitted. The whole system shown in FIG. 9 is controlled by computer readable instructions which are generally stored in the hard disk 910, EPROM or other nonvolatile storage such as software. The software can be downloaded from a network (not shown in the figures), stored in the hard disk 910 Alternatively, a software downloaded from a network can be loaded into the RAM 902 and executed by the CPU 901 so as to complete the function determined by the software.

Although the computer system described in FIG. 9 can support the method according to the present invention, this system is only one example of a computer system. Those skilled of the art should understand that other computer system designs can be used to implement the present invention.

The present invention can be implemented as a computer program product that is used, for example, by a computer system shown in FIG. 8 and as a computer program product that includes codes for the method of the present invention. The codes can be stored in the storage devices in other computer systems before they are used such as being stored in hard disks or removable storages like an optical or floppy disk or such as being downloaded via Internet or other computer networks.

It will be clear to those skilled in the art that the above and other various modifications can be made in the present invention without departing from the spirit and scope of the present invention. Thus, modifications and changes of the present invention are intended to be covered by the present invention as long as they are within the scope of appended claims and their equivalents.

We claim:

1. A method for providing quality of service control capability for a presence server, the method comprising the steps of:

receiving a first plurality of session initiation protocol messages from a session initiation protocol application/presence application layer of said presence server and a second plurality of session initiation protocol messages from a session initiation protocol stack layer of said presence server;

classifying each given one of said first plurality of session initiation protocol messages and each given one of said second plurality of session initiation protocol messages based on a quality of service policy to produce a plurality of classified session initiation protocol messages, wherein said quality of service policy specifies at least some of said classified session initiation protocol messages as having a first maximum waiting time and at least others of said classified session initiation protocol messages as having a second maximum waiting time different than said first maximum waiting time;

adding said classified session initiation protocol messages into at least one bi-directional session initiation protocol message queue for treatment in accordance with said quality of service policy, wherein said bi-directional session initiation protocol message queue is bi-directional in that it holds given ones of said classified session initiation protocol messages from said first plurality of session initiation protocol messages that are destined for said session initiation protocol stack layer of said presence server and given ones of said classified session initiation protocol messages from said second plurality of session initiation protocol messages that are destined for said session initiation protocol application/presence application layer of said presence server;

for a first portion of said classified session initiation protocol messages for which an overtime has not occurred, fetching said first portion of classified session initiation protocol messages from said bi-directional session initiation protocol message queue corresponding to said quality of service policy, to obtain fetched session initiation protocol messages;

for a second portion of said classified session initiation protocol messages for which an overtime has occurred, deleting said second portion of said classified session initiation protocol messages from said bi-directional session initiation protocol message queue if said second portion of said classified session initiation protocol messages messages have not yet been processed: and delivering said fetched session initiation protocol messages after a predetermined time corresponding to said quality of service policy, wherein said delivering comprises delivering those given ones of said first portion of classified session initiation protocol messages from said first plurality of session initiation protocol messages to said session initiation protocol stack layer of said presence server and those given ones of said first portion of classified session initiation protocol messages from said second plurality of session initiation protocol messages to said session initiation protocol application/presence application layer of said presence server.

2. The method according to claim 1, wherein said first and second pluralities of session initiation protocol messages have destination addresses, further comprising:
  associating at least some of said first and second pluralities of session initiation protocol messages with a corresponding Siplets according to their destination addresses; and
  invoking said corresponding Siplets to perform processing before delivering said fetched session initiation protocol messages after said predetermined time corresponding to said quality of service policy.

3. The method according to claim 1, further comprising:
  checking current system workloads to produce a check result; and
  abandoning at least some of said classified session initiation protocol messages having a low service level according to said quality of service policy without adding said at least some of said classified session initiation protocol messages having said low service level into said bi-directional session initiation protocol message queue, in response to said check result.

4. The method according to claim 1, wherein said first and second pluralities of session initiation protocol messages have destination addresses and attributes, further comprising:
  merging two of said classified session initiation protocol messages with the same destination address into one session initiation protocol message according to the attributes of said two classified session initiation protocol messages and said quality of service policy.

5. A device for providing quality of service control capability for a presence server, comprising:
  a quality of service policy enforcement unit which fetches and provides a quality of service policy related to:
    a first plurality of received session initiation protocol messages from a session initiation protocol application/presence application layer of said presence server, and
    a second plurality of received session initiation protocol messages from a session initiation protocol stack layer of said presence server;
  a session initiation protocol message classifier which classifies each given one of said first plurality of session initiation protocol messages and each given one of said second plurality of session initiation protocol messages according to said quality of service policy provided by said quality of service policy enforcement unit to produce a plurality of classified session initiation protocol messages, wherein said quality of service policy specifies at least some of said classified session initiation protocol messages as having a first maximum waiting time and at least others of said classified session initiation protocol messages as having a second maximum waiting time different than said first maximum waiting time;
  a SIP message delivery comprising:
    (i) a bi-directional session initiation protocol message queue for storing said classified session initiation protocol messages for treatment in accordance with said quality of service policy, wherein said bi-directional session initiation protocol message queue is bi-directional in that it holds given ones of said classified session initiation protocol messages from said first plurality of session initiation protocol messages that are destined for said session initiation protocol stack layer of said presence server and given ones of said classified session initiation protocol messages from said second plurality of session initiation protocol messages that are destined for said session initiation protocol application/presence application layer of said presence server; and
    (ii) a session initiation protocol message dispatcher which:
      for a first portion of said classified session initiation protocol messages for which an overtime has not occurred, fetches said first portion of classified session initiation protocol messages from said bi-directional session initiation protocol message queue corresponding to said quality of service policy, to obtain fetched session initiation protocol messages,
      for a second portion of said classified session initiation protocol messages for which an overtime has occurred, deletes said second portion of said classified session initiation protocol messages from said bi-directional session initiation protocol message queue if said second portion of said classified session initiation protocol messages have not yet been processed, and
      delivers said fetched session initiation protocol messages after a predetermined time corresponding to said quality of service policy, wherein said delivering comprises delivering those given ones of said first portion of classified session initiation protocol messages from said first plurality of session initiation protocol messages to said session initiation protocol stack layer of said presence server and those given ones of said first portion of classified session initiation protocol messages from said second plurality of session initiation protocol messages to said session initiation protocol application/presence application layer of said presence server.

6. The device according to claim 5, wherein said first and second pluralities of session initiation protocol messages have destination addresses, further comprising:
  a message-Siplet relationship unit for associating at least some of said first and second pluralities of session initiation protocol messages with corresponding Siplets according to their destination addresses,
  wherein said session initiation protocol message dispatcher invokes said corresponding Siplets to perform processing before delivering said fetched session initiation protocol messages.

7. The device according to claim 5, further comprising:
  a workload sensing unit which checks current system workload and produces a check result,
  wherein said session initiation protocol message classifier abandons at least some of said classified session initiation protocol messages having a low service level according to said quality of service policy without adding said at least some of said classified session initiation protocol messages having said low service level into said bi-directional session initiation protocol message queue in response to said check result, and said session initiation protocol message classifier puts at least some of said classified session initiation protocol messages not having said low service level according to said quality of service policy into said bi-directional session initiation protocol message queue corresponding to said quality of service policy.

8. The device according to claim 5, wherein said first and second pluralities of session initiation protocol messages have destination addresses and attributes, and wherein said session initiation protocol message dispatcher merges two of said classified session initiation protocol messages with the same destination address into one session initiation protocol message according to the attributes of said two classified session initiation protocol message and said quality of service policy.

9. A presence system for supporting quality of service control, the system comprising:
   a memory;
   at least one processor, coupled to said memory; and
   a computer readable storage medium comprising instructions which, when loaded into said memory, cause said memory and said at least one processor to cooperatively implement:
      a session initiation protocol application/presence application entity, which provides a service program to be used by users:
      a Siplet container entity which provides services for said session initiation protocol application/presence application entity; and
      a session initiation protocol stack entity which implements a session initiation protocol in order to provide a service for said Siplet container entity;
   wherein said Siplet container entity is implemented so as to:
      (i) receive a first plurality of session initiation protocol messages from said session initiation protocol application/presence application entity of said presence system and a second plurality of session initiation protocol messages from said session initiation protocol stack entity of said presence system:
      (ii) classify each given one of said first plurality of session initiation protocol messages and each given one of said second plurality of session initiation protocol messages based on a quality of service policy to produce a plurality of classified session initiation protocol messages, wherein said quality of service policy specifies at least some of said classified session initiation protocol messages as having a first maximum waiting time and at least others of said classified session initiation protocol messages as having a second maximum waiting time different than said first maximum waiting time:
      (iii) add said classified session initiation protocol messages into at least one bi-directional session initiation protocol message queue for treatment in accordance with said quality of service policy, wherein said bi-directional session initiation protocol message queue is bi-directional in that it holds given ones of said classified session initiation protocol messages from said first plurality of session initiation protocol messages that are destined for said session initiation protocol stack entity of said presence system and given ones of said classified session initiation protocol messages from said second plurality of session initiation protocol messages that are destined for said session initiation protocol application/presence application entity of said presence system:
      (iv) for a first portion of said classified session initiation protocol messages for which an overtime has not occurred, fetch said first portion of classified session initiation protocol messages from said bi-directional session initiation protocol message queue corresponding to said quality of service policy, to obtain fetched session initiation protocol messages;
      (v) for a second portion of said classified session initiation protocol messages for which an overtime has occurred, delete said second portion of said classified session initiation protocol messages from said bi-directional session initiation protocol message queue if said second portion of said classified session initiation protocol messages have not yet been processed: and
      (vi) deliver said fetched session initiation protocol messages after a predetermined time corresponding to said quality of service policy, wherein said delivering comprises delivering those given ones of said first portion of classified session initiation protocol messages from said first plurality of session initiation protocol messages to said session initiation protocol stack layer of said presence server and those given ones of said first portion of classified session initiation protocol messages from said second plurality of session initiation protocol messages to said session initiation protocol application/presence application layer of said presence server.

* * * * *